UNITED STATES PATENT OFFICE.

ALFRED EDWARDS, OF NEW HAVEN, CONNECTICUT.

FERTILIZER FOR TOBACCO CROPS.

SPECIFICATION forming part of Letters Patent No. 290,633, dated December 18, 1883.

Application filed April 3, 1883. (No specimens.)

*To all whom it may concern:*

Be it known that I, ALFRED EDWARDS, of New Haven, in the county of New Haven and State of Connecticut, have invented certain new and useful Improvements in Fertilizers for Tobacco; and I do hereby declare that the following is a full, clear, and exact description thereof, which will enable others skilled in the art to which it appertains to make and use the same.

To prepare my improved tobacco-fertilizer, I take of fresh horse-manure (collected from stables before it becomes heated) one ton, or about two thousand pounds, of blood one hundred pounds, (as a minimum,) and of crude potash one hundred pounds, (more or less.) These ingredients are thoroughly mixed in a pug-mill or by other suitable machinery, and during the process of mixing are also broken up or comminuted to such fineness as may be found desirable.

This fertilizer is especially adapted for tobacco, it being essentially a tobacco-fertilizer. The advantages of fresh horse-manure for this purpose are that it produces a rich, dark, and heavy leaf, the blood and potash increasing its value as a plant-food. To secure the best results, therefore, it is important that the whole mass be thoroughly broken up and mixed, so as to form a homogeneous mass of such fineness that it may readily be distributed upon the soil where it is to be used.

I ship this fertilizer by packing it in barrels or receptacles of peculiar construction and arrangement, by which I provide for the escape of excess of moisture and gases generated in the receptacle. This is of importance, especially where the fertilizer is shipped to Cuba and other hot climates requiring considerable time *in transitu*.

The improved barrel or receptacle for packing fertilizers invented by me forms the subject of a separate application for Letters Patent.

I am aware that it is not new in the manufacture of fertilizers to fix the ammonia by treating the ingredients with potash; and I am also aware that the ingredients of my fertilizer compound have been used before, separately or in different combinations, for fertilizing purposes; but the novelty of my invention consists in the mixture of the fresh horse-manure, blood, and potash, in specified proportions, and in comminuting this mixture or compound in the manner described, whereby I produce a merchantable article of fertilizer in which the potash serves to aid in decomposing the blood in the manure, as the treatment or admixture of the manure with the potash renders it in a fit condition to decompose and diffuse the blood evenly throughout the entire mass, so that it is in a condition for comminution, or reducing it to fine particles of the proper degree of cohesion and consistence.

I therefore claim and desire to secure by Letters Patent of the United States—

A fertilizer compound for tobacco crops, composed of fresh horse-manure collected before heating, blood, and potash, mixed in the proportions set forth and finely comminuted.

In testimony that I claim the foregoing as my own 1 have hereunto affixed my signature in presence of two witnesses.

ALFRED EDWARDS.

Witnesses:
JNO. C. NORTH,
CLIFFORD C. CHALKER.